March 24, 1970   O. POMMELLET   3,502,370
SEATS, NOTABLY FOR HEAVY VEHICLES
Filed April 8, 1968   4 Sheets-Sheet 1
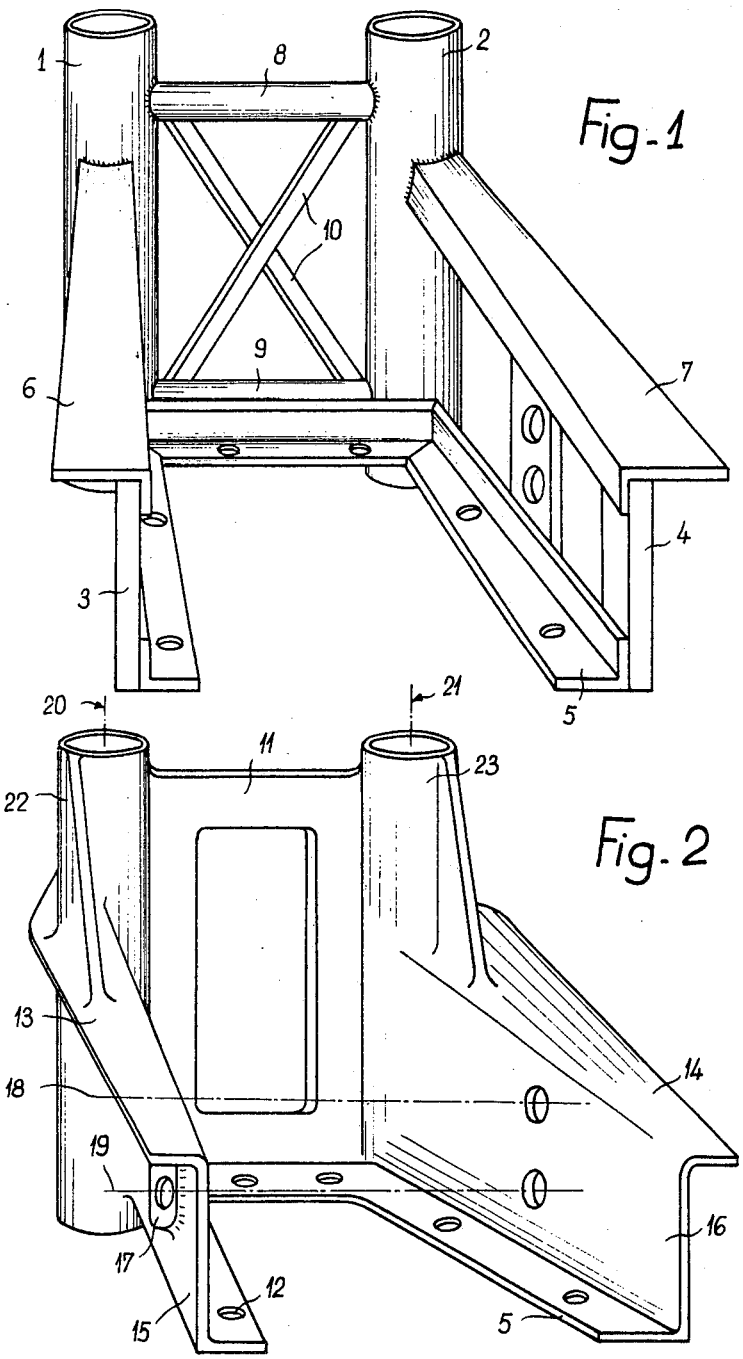

March 24, 1970 — O. POMMELLET — 3,502,370
SEATS, NOTABLY FOR HEAVY VEHICLES
Filed April 8, 1968 — 4 Sheets-Sheet 2

March 24, 1970 O. POMMELLET 3,502,370
SEATS, NOTABLY FOR HEAVY VEHICLES
Filed April 8, 1968 4 Sheets-Sheet 3

March 24, 1970  O. POMMELLET  3,502,370
SEATS, NOTABLY FOR HEAVY VEHICLES

Filed April 8, 1968  4 Sheets-Sheet 4

United States Patent Office 3,502,370
Patented Mar. 24, 1970

3,502,370
SEATS, NOTABLY FOR HEAVY VEHICLES
Olivier Pommellet, Billancourt, France, assignor to Regie Nationale des Usines Renault, Billancourt, France
Filed Apr. 8, 1968, Ser. No. 719,349
Claims priority, application France, Apr. 13, 1967, 102,577
Int. Cl. A47c 3/00
U.S. Cl. 297—285                                    13 Claims

ABSTRACT OF THE DISCLOSURE

A seat for heavy vehicles of the type generally having no suspension or shock-absorbing mechanisms and comprising a seat having a bottom, a back and two arm rest portions, suspension arms resiliently mounting the seat on the vehicle, and means on the back of the seat to impart vertical stability to the seat. The last-mentioned means preferably comprises symmetrically disposed resiliently sprung masses operating as inertia weights.

---

The present invention relates to a stabilized seat for heavy vehicles and notably for earthmoving machines.

In vehicles of this type which have no suspension and shock-absorbing mechanisms only the tires introduce a resilient factor between the ground and the body of the vehicle or machine. As a result, when the vehicle is driven on ordinary roads, sometimes at relatively high speeds, the ponderal mass supported and sprung by the tires is subjected to periodic oscillations of low frequency but high amplitude, the only shock-absorbing effect being provided by the elastic tires which is obviously inadequate for restraining the vibratory motion.

As a consequence, the driver of the machine, sitting in a seat provided with a generally very rudimentary inherent suspension system, is subjected, by reason of the resonance phenomenon, to periodic impulses generating high accelerations and capable of impressing complex movements of considerable amplitude to his body.

To remedy these inconveniences, recent studies proved that this type of heavy vehicle or machine could advantageously be equipped with a seat to which an adequate vertical stability is imparted by using a suspension system comprising a resiliently sprung mass and operating according to the well-known principle of inertia weights or "beaters."

In hitherto known structures of this type the sprung mass is disposed under the seat, between a fixed frame structure rigid with the vehicle frame and a movable frame structure constituting the seat support. However, since the force and therefore the permissible strokes of the inertia weight must be relatively considerable in the case of heavy vehicles having a relatively low oscillation frequency, this arrangement is objectionable in that a seat having a great flexibility cannot be obtained unless it is suspended at a relatively substantial height above the fixed frame structure, which is detrimental to the driver who is subjected to important vertical movements, with his feet alternately and more or less engaging the floor, and his head exposed to dangerous shocks against the roof of the cab or cockpit.

It is the object of this invention to provide a seat capable of remedying the inconveniences set forth hereinabove and which is stabilized in the vertical direction. This seat having a resiliently sprung mass is characterized in that this resiliently sprung mass is disposed behind the seat and vertically movable along the seat back, adequate means being provided for resiliently suspending the seat independently of the resiliently sprung mass.

According to another feature characterized this invention, said resiliently sprung mass consists of a pair of identical inertia-weight devices or beaters disposed symmetrically in casings provided in the back of the seat.

Other features of this invention will appear as the following description proceeds with reference to the accompanying drawings, in which:

FIGURE 1 is a perspective view of the seat frame structure of the seat according to this invention;

FIGURE 2 is another perspective view showing a modified form of embodiment of the seat frame structure;

Figure 3:
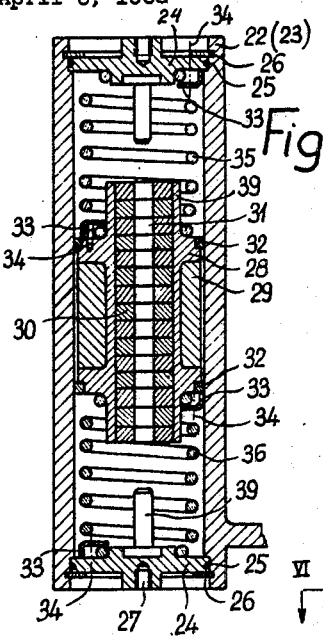
FIGURE 3 is an axial section of an inertia-weight cylinder or beater.

According to a first form of embodiment the seat frame structure according to this invention consists of welded elements as shown in FIGURE 1, namely by connecting a pair of vertical parallel tubes 1 and 2 to a triangulated or braced assembly comprising rigid supports 3 and 4 for securing the suspension arms, a hollowed bottom 5 and arm-rests 6 and 7.

A pair of horizontal tubes 8 and 9 reinforced by bracing members 10 interconnect the vertical tubes 1 and 2 and constitute the back of the seat. Since the pivot axes must be located with a sufficient degree of geometrical precision, complementary machining operations are required after the welding steps. This procedure could be applicable to mass-produced seats, and in this case one portion of the seat elements may be manufactured by stamping.

According to another form of embodiment illustrated in FIGURE 2, the seat and the beater or inertia-weight cylinders may be constructed in the form of a compact or unitary aluminium casting. The seat bottom 5 is also hollowed, like the back 11, to reduce the weight of the assembly, and the seat upholstery elements are secured by means of adequate holes 12. The armrests 13 and 14 cast integrally with the seat frame complete the side walls 15 and 16 of the seat carrying on their outer bosses 17 machined for receiving the suspension pivot pins. The machining axes 18 and 19 of these pivot pins are disposed at right angles to the axes 20 and 21 of the pair of beater cylinders 22 and 23 disposed in turn at right angles to the seat bottom 5. The beater cylinders are carefully machined and provided with a hard chromium deposit before being lapped.

As shown in FIGURE 3, the cylinders 22 and 23 are closed at their top and bottom ends by covers 24 provided with a sealing gasket 25 and retained by circlips 26 on adequate shoulders; a central tapped hole 27 is provided to facilitate the fitting and removal of the covers.

The sliding inertia weight or mass of each beater consists of a cylindrical steel body 28 formed with a central bore and loaded by an annular intermediate mass of antimoniated lead 29 and by a stack of washers 30, also of lead, retained in the central bore of said body 28 by crimping. These washers provide through their aligned central holes a cylindrical air passage 31 concentric to the sliding inertia weight.

This inertia weight is adapted to slide in the cylinder 22 (23) and the solid frictional contact is minimized by interposing a pair of sintered bronze rings 32 between the surfaces in mutual frictional engagement, each ring 32 being retained in position by three anchor members 33 consisting of staples bent at right angles, disposed at spaced angular intervals and secured by screws 34.

Figure 4:
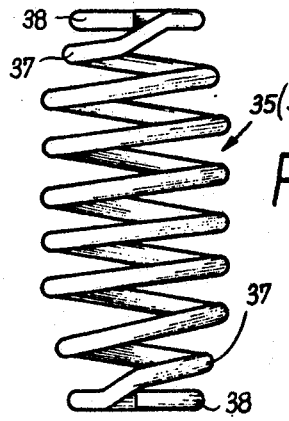
FIGURE 4 shows the detail of a beater spring.

The sliding inertia weight is disposed between a pair of coil compression springs 35 and 36 wound on a same diameter, manufactured from the same steel wire and formed with the same number of turns, only the helical pitch of each unstressed spring differs from that of the other spring in each pair. Thus, spring 35, when loaded with one-half of the weight of said sliding body under tractive conditions, and spring 36, under the same load but under compressive conditions, should have an equal length such that the sliding body lies exactly at mid-length of the relevant cylinder when inoperative. Whilst the diameter of the central portion of these springs is such that during the movements of the sliding inertia weight or body said springs cannot engage the inner cylinder walls, the end turns 37 and 38, as shown in detail in FIGURE 4, are smaller so as to be centered by the shoulders formed on the inner faces of cover 24, on the one hand, and on the ends of the sliding steel body 28, on the other hand. The last turn 38 on either side is flattened along approximately the three-fourths thereof and the adjacent turn 37 is bent as shown to clear the three anchor members or staples 33 securing the spring to the cover 24 or the sliding body 28.

The spring characteristics are calculated by making due allowance for the end permanent deformations thereof, so that the necessary flexibility requirements are met as well as the resistance requirements when the maximum deflection is applied to the spring. This maximum deflection takes place when the sliding body 28 of the beater contacts the cover 24 at one or the other end of the cylinder. The maximum stroke is selected to be greater than the value calculated according to the formula, and smaller than the stroke necessary for causing the spring turns to abut against each other.

Under certain circumstances the movable body 28 of the beater is liable to receive impulses capable of impressing an abnormal stroke thereto. This is observed for instance when the vehicle, as a consequence of major obstacles or ground unevennesses to be overcome during its operation, receives impulses of relatively great amplitude, and also when certain combinations of periodic movements take place (transitory phenomena). In this case the oscillating movable body may strike the covers 24 and the shock is felt very unpleasantly by the occupant of the seat, and may also be a cause of damages.

These abnormal shocks may be rendered more infrequent by increasing the maximum stroke to a value considerably greater than the normal value. However, corresponding increments in the dimensions and weight of the device set a limit to this procedure.

The shock effect may also be attenuated by lining the covers 24 with rubber pads, but this method is moderately efficient and the following contrivance is preferred:

It was observed that an efficient operation of the inertia weight device was scarcely consistent with the damping of the oscillating inertia weight or body 28. Therefore, the axial passage 31 formed by the aligned holes of washers 30 was given a diameter sufficient to enable the air forced out from an end chamber of decreasing volume to be transferred to the other end chamber without exerting either an appreciable retarding force on the body 28 or a compression effect likely to modify the stiffness of the resilient system. Therefore, cylindrical rods 39 of a diameter slightly smaller than that of said axial passage 31 in the movable inertia weight or body 28 are centered in each cover 24; under these conditions, as this body 28 approaches its theoretical end position, the air passage is throttled and the resulting air compression will efficiently brake the last portion of the corresponding movement.

Since the use of a two-beater seat is preferred to a single-beater seat, it was observed that if the frequencies of the two beaters are properly tuned, the synchronism betwen the movements of the two sliding inertia weights or bodies 28 is ensured under any circumstances. Besides, reasons based on over-all dimensions, symmetry and aesthetics are in favor of this solution.

The seat suspension (which is independent of the inertia-weight system) may be constructed in various ways; however, among the various possible solutions the choice should be mdae as a function of the seat shape requirements set up by the space available on board the vehicle. The suspension mechanism comprises guide members, elastic members and shock-absorbers.

According to a first form of embodiment of this suspension mechanism, not shown in the drawing, guide means are provided on a vertical cylindrical column, associated with an inner coil spring or a hydropneumatic spring.

Figure 5:
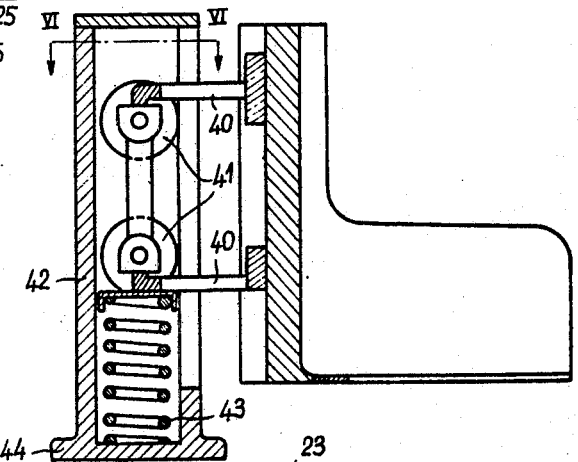
FIGURE 5 shows in elevational and sectional view a seat equipped with a suspension mechanism comprising vertical back slides, the section being taken along the line V—V of FIGURE 6.
Figure 6:
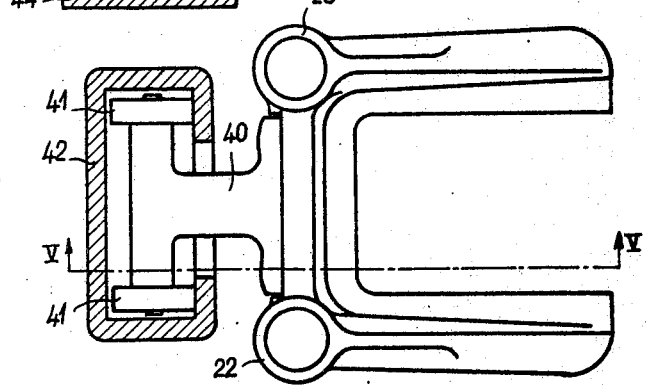
FIGURE 6 is a plan and part-sectional view from above of a seat equipped with a suspension mechanism, the section being taken long the line VI—VI of FIGURE 5.

In a second form of embodiment of the suspension mechanism as shown in FIGURES 5 and 6 an assembly comprising two horizontal arms 40 secured to the back of the seat is rigid with a pair of rollers 41 movable along vertical walls within a hollowed guide case 42. A coil compression spring 43 disposed in the lower part or bottom of this case 42, beneath the lower arm 40, is adapted to damp out the seat movements. The bottom 44 of the guide and spring case is secured to the frame of the machine or vehicle.

Figure 7:
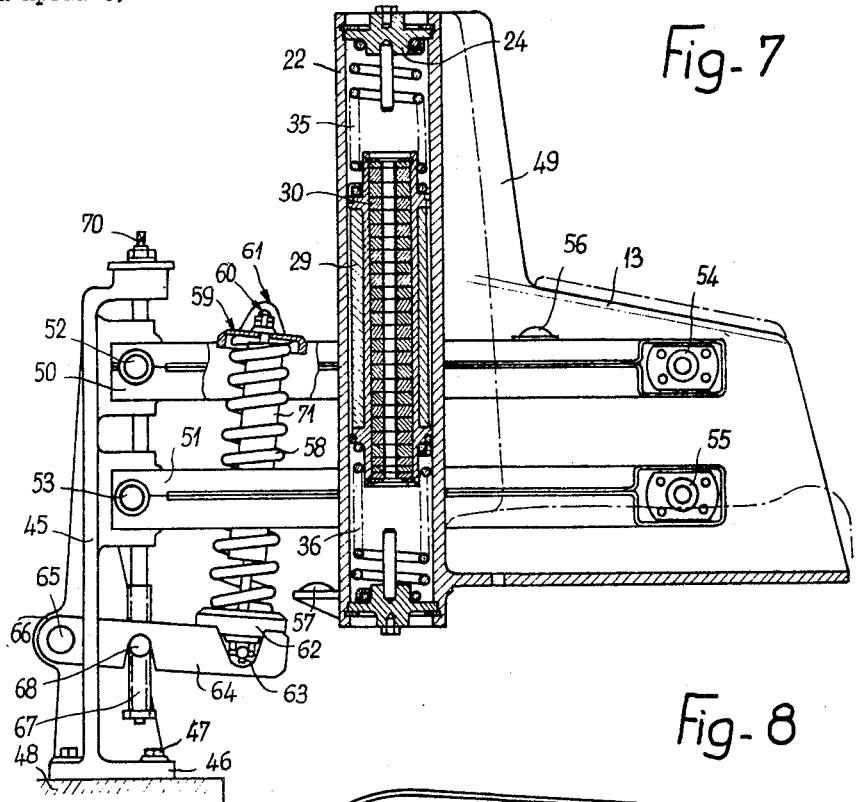
FIGURE 7 is a side elevational view, with a partial section taken along the beater's axis, showing a seat equipped with a suspension mechanism comprising parallel-motion links.
Figure 8:
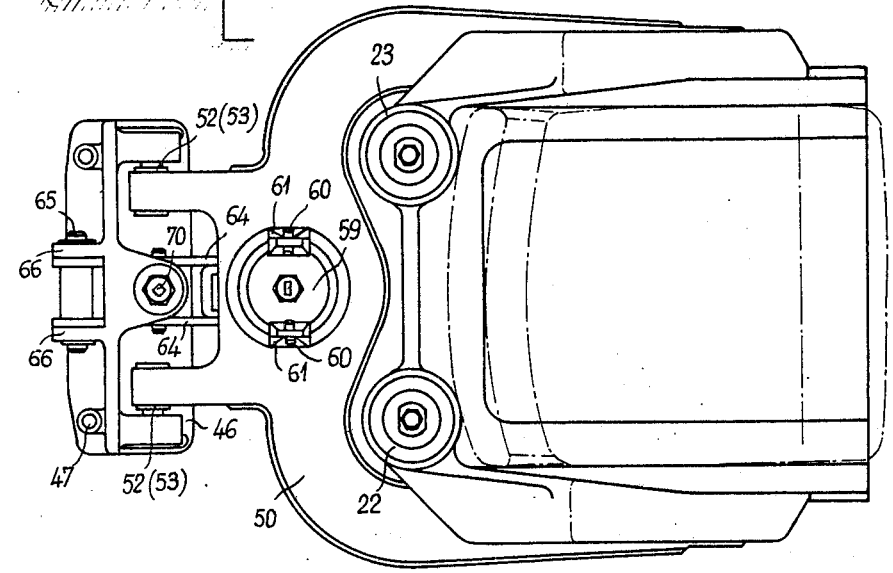
FIGURE 8 is a plan view of the seat shown in FIGURE 7.
Figure 9:
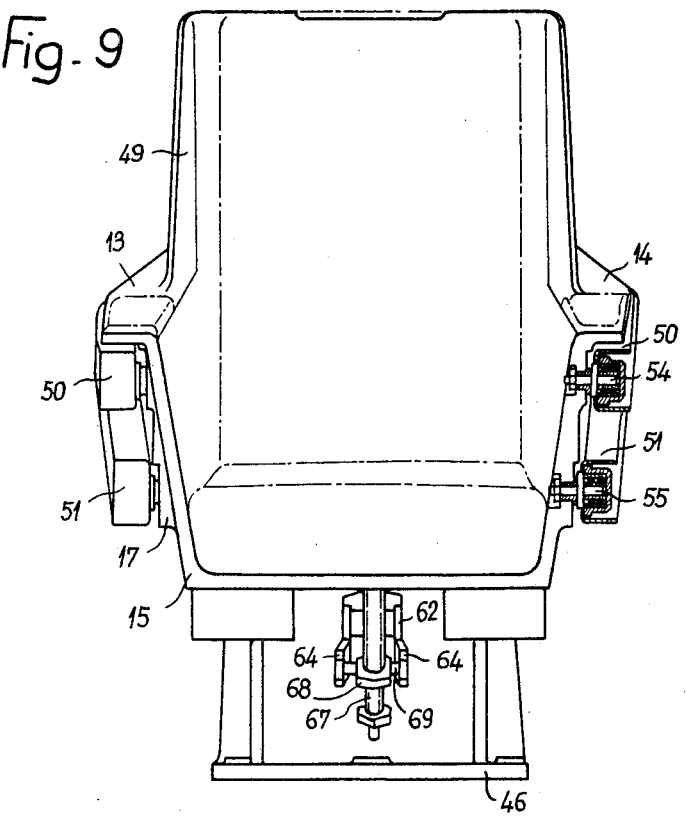
FIGURE 9 is a front elevational view of the same seat.

In a third preferred form of embodiment shown in FIGURES 7, 8 and 9 the seat suspension mechanism comprises a parallel-motion system constituting a deformable parallelogram, and elastic means in the form of helical or coil compression springs.

The parallel-motion system comprises the following component elements: a fixed vertical bracket 45 rigidly secured at its bottom 46 by means of bolts 47 or the like on a cross member 48 of the vehicle, the seat proper 49 and the suspension arms 50 and 51.

The pivotal mountings 52, 53, 54 and 55 of these suspension arms on the bracket 4 and the sides of seat 49 are of the ball-bearing type in order to minimize solid frictional contacts in the suspension, an important requirement for obtaining an efficient stabilization.

The suspension arms are relatively long so that the vertical movements of the seat have only very limited horizontal components.

The seat movements are limited downwards by the abutment pad 56 engaging the arm-rests 13 and 14 when the maximum deformation of the parallel-motion system is attained, and upwards by another abutment pad 57 engaging the suspension arm 51 at the limit of the parallel-motion deformation.

The elastic suspension system is constructed as follows:

A coil compression spring 58 is mounted between a pair of opposite pivoted cups 59 and 62. The first cup 59 is adapted to pivot on a pair of trunnions 60 engaging a pair of corresponding bearings 61 rigid with the arm 50. The other cup 62 is pivoted on a pair of trunnions 63 engaging V-notches formed in a lever 64. The helical spring 58 crossing the lower suspension arm 51 without contacting same will thus take a fixed bearing on lever 64 and cause the elastic actuation of lever 50. The lever 64 can oscillate about the fixed pivot pin 65 carried by bosses 66 of bracket 45, so that the initial stress of the suspension spring 58 can be preset by simply rotating the vertical screw 67 having a nut 68 pivoted by means of its wings 69 on lever 64. Under these conditions, the height of the seat can be adjusted as a function of the driver's or occupant's weight by turning the projecting square-sectioned upper end of said screw.

This initial adjustment is necessary, considering the great selected flexibility of the seat. By way of example, the stiffness of the suspension across the seat bottom, in the case considered herein, is 1.14 kgp./mm. (0.64 lb.p.in.).

A telescopic shock absorber 71 is mounted concentrically to said spring 58 and has its ends secured with the interposition of rubber pads to the aforesaid oscillating cups 61 and 62. This shock absorber is equally calibrated for upward and downward movement (damping and rebound).

The inherent frequency of the seat suspension, for an average occupant's weight, should as much as possible be remote from usual platform frequencies.

In the experimentl seat of this invention this frequency is 1.4 Hertz.

Figure 10:
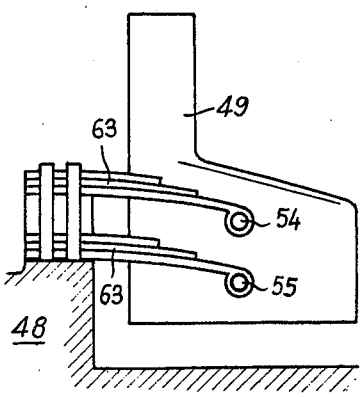
FIGURE 10 is a side elevational view of a seat equipped with a leaf-spring suspension system of the semi-cantilever type.

Finally, FIGURE 10 illustrates a seat 49 according to another embodiment of this invention, wherein the seat suspension arms consist of leaf springs 63 mounted in the so-called semi-cantilever fashion and secured to the vehicle frame structure 48, their movable ends being pivotally attached at 54 and 55 to the side flanges of the seat structure.

In this case the shock absorbing function is derived from the mutual frictional engagement of the leaf springs.

Alternately, one of the springs may be replaced by a rigid pivotally mounted arm.

Of course, although the above disclosure and the attached drawing illustrate typical and different forms of embodiment of the seat of this invention, it will readily occur to anybody conversant with the art that various modifications may be brought thereto as set forth in the appended claims.

I claim:

1. A seat for heavy vehicles comprising a seat frame having a bottom, a back, and two arm rest portions, a suspension mechanism resiliently suspending said seat frame on said vehicle and comprising at least one pair of parallel arms connected to the sides of said seat frame and to a point on the vehicle below and behind said seat frame, and means to impart vertical stability to said seat comprising at least one substantially vertical housing integral with said back of the seat and a resiliently sprung mass adapted to move subtantially vertically within each said housing.

2. A seat according to claim 1 in which said resiliently sprung mass comprises a pair of identical inertia weights disposed symmertically with respect to said seat frame.

3. A seat according to claim 2, wherein each said inertia weight comprises a cylindrical body having a central axial bore, an annular mass of high density metal surrounding at least part of said body, a stack of washers of the same said high density metal having a central hole and mounted in said bore to constitute an axial air passage, means to fix said washers in said central bore, said high density metal serving to ballast said body.

4. A seat according to claim 3, further comprising slip rings provided at the ends of said cylindrical body and secured thereto by anchor members in the form of staples bent at right angles and disposed at spaced angular intervals, end covers closing each end of said housing, a coil compression spring secured to the corresponding cover and each end of said cylindrical body.

5. A seat according to claim 4, wherein the two compression springs in each inertia weight are identical but have unequal pitches, whereby in the inoperative condition of the seat the compressed lower and tensioned upper springs have the same length.

6. A seat according to claim 3, further comprising a cylindrical rod of a diameter slightly less than that of said axial air passage formed by said washers secured to and centered on each of said end covers, said rods serving to throttle said axial passage during the end portions of the movement of said cylindrical body.

7. A seat according to claim 1, wherein said housings for the sprung mass each consist of tube sections secured symmetrically to the seat back.

8. A seat according to claim 1, wherein said housings for the sprung mass each consist of cylinders cast integrally and symmetrically with the seat back.

9. A seat according to claim 1, wherein said suspension mechanism comprises a set of parallel, substantially horizontal arms having one end secured to the seat back and rollers on the other end, a vertical guide case fixed to the vehicle, a resilient member mounted inside said case, said rollers rolling in said case with their movement being dampened by said resilient member.

10. A seat according to claim 1, wherein said suspension mechanism comprises a pair of parallel upper suspension arms and a pair of parallel lower suspension arms, a coil compression spring mounted between a pair of pivotally mounted cups of which the upper cup is trunnioned on said upper suspension arms and the lower cup is trunnioned on a lever pivotally mounted on a fixed pin, a vehicle frame bracket carrying said lever, and a vertical screw engaging said bracket to adjust the position of said lever.

11. A seat according to claim 10, further comprising a hydraulic telescopic shock absorber mounted concentrically to said coil compression spring between said cups, elastic pads interposed between said cups and said shock absorber.

12. A seat according to claim 1, wherein the arms of said suspension mechanism comprise leaf-springs mounted in semi-cantilever fashion on the vehicle, said leaf-springs being pivotally attached to seat sides.

13. A seat according to claim 1, wherein one of said arms of said suspension mechanism comprises a leaf-spring mounted in semi-cantilever fashion on the vehicle and the other said arm is a pivotally mounted rigid arm.

References Cited

UNITED STATES PATENTS

| | | | |
|---|---|---|---|
| 2,630,854 | 3/1953 | Neher | 248—399 |
| 2,652,880 | 9/1953 | Gundersen | 248—399 |
| 2,667,209 | 1/1954 | Gundersen | 248—399 |
| 2,894,562 | 7/1959 | Peller | 248—399 |
| 2,910,112 | 10/1959 | Ogden | 248—399 |
| 2,949,153 | 8/1960 | Hickman | 248—399 |
| 3,140,118 | 7/1964 | Dorn | 297—285 |
| 3,178,148 | 4/1965 | Manke | 248—399 |
| 3,268,200 | 8/1966 | Eicher | 248—399 |
| 3,319,920 | 5/1967 | Freedman et al. | 248—399 |
| 3,423,060 | 1/1969 | Fulling et al. | 248—399 |

BOBBY R. GAY, Primary Examiner

GLENN O. FINCH, Assistant Examiner

U.S. Cl. X.R.

248—399